S. Gibson,
Scrubbing Brush.
No. 96,219.        Patented Oct. 26, 1869.
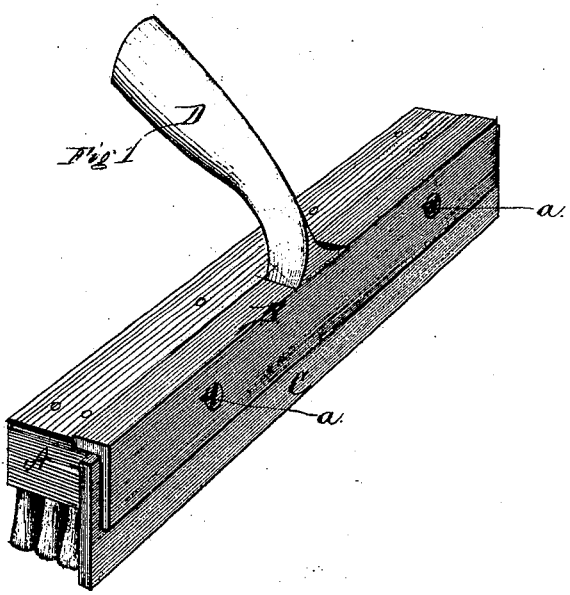
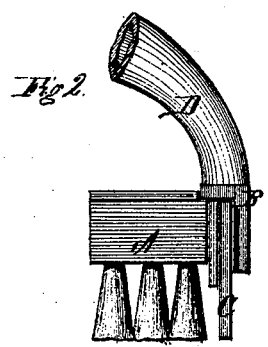
Witnesses.
Harry King
Inventor.
Samuel Gibson
per
Alexander Mason
Attys.

United States Patent Office.

SAMUEL GIBSON, OF SAFE HARBOR, PENNSYLVANIA.

Letters Patent No. 96,219, dated October 26, 1869.

IMPROVED SCRUBBING-BRUSH.

The Schedule referred to in these Letters Patent and making part of the same.

*To all whom it may concern:*

Be it known that I, SAMUEL GIBSON, of Safe Harbor, in the county of Lancaster, and in the State of Pennsylvania, have invented certain new and useful Improvements in Scrubbing-Brushes; and do hereby declare that the following is a full, clear, and exact description thereof, reference being had to the accompanying drawings, and to the letters of reference marked thereon, making a part of this specification.

My present invention is an improvement upon the "scrubbing-brush" for which Letters Patent were granted to me, October 6, 1868; and consists in casting the socket for the handle in one piece, with an L-shaped bar to protect the joint between the brush and the rubber from water, and in the mode of connecting the parts together.

In order to enable others skilled in the art to which my invention appertains, to make and use the same, I will now proceed to describe its construction and operation, referring to the annexed drawings, in which—

Figure 1 is a perspective view, and
Figure 2, an end view.

A represents an ordinary scrubbing-brush, made in any of the known and usual ways.

An L-shaped bar, B, is secured to the front edge of the brush A, by means of screws *a a*, which are screwed into the brush, the upper side of said bar resting on the top of the brush, and may be let into the same, so as to present an even surface, or may, if so desired, be made so as to entirely cover the top of the brush.

Between the front edge of the brush A and the bar B, is inserted one or more strips of rubber, C, of suitable dimensions, which are held by means of the screws *a a* passing through the same, the L-shaped bar B preventing any water from coming into said joint, and thus preventing it from rotting as soon as would otherwise be the case.

With the bar B, on its upper side, is cast the socket D, into which the handle is inserted.

Having thus fully described my invention,
What I claim as new, and desire to secure by Letters Patent, is—

The combination of the brush A, L-shaped bar B, socket D, and one or more rubber strips, C, connected to the brush-body by the screws *a*, all constructed and arranged as shown and described.

In testimony that I claim the foregoing, I have hereunto set my hand, this 28th day of September, 1869.

S. GIBSON.

Witnesses:
C. L. EVERTS,
A. N. MARR.